US008914525B2

(12) United States Patent
Ku

(10) Patent No.: US 8,914,525 B2
(45) Date of Patent: *Dec. 16, 2014

(54) METHOD AND APPARATUS RESOLVING ENUM DATA COLLISIONS

(71) Applicant: AT&T Intellectual Property I, L.P., Atlanta, GA (US)

(72) Inventor: Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/893,001

(22) Filed: May 13, 2013

(65) Prior Publication Data

US 2013/0250944 A1  Sep. 26, 2013

Related U.S. Application Data

(63) Continuation of application No. 12/509,801, filed on Jul. 27, 2009, now Pat. No. 8,458,342.

(51) Int. Cl.
*G06F 15/16* (2006.01)
*H04L 29/12* (2006.01)
*H04L 12/66* (2006.01)
*H04L 12/24* (2006.01)

(52) U.S. Cl.
CPC ............ *H04L 12/66* (2013.01); *H04L 61/2046* (2013.01); *H04L 29/1216* (2013.01); *H04L 29/12264* (2013.01); *H04L 61/157* (2013.01); *H04L 41/0806* (2013.01); *H04L 61/1523* (2013.01)
USPC .......................................... 709/228; 709/227

(58) Field of Classification Search
USPC .................. 709/223–229, 245; 370/351–356
See application file for complete search history.

(56) References Cited

U.S. PATENT DOCUMENTS

| 7,027,582 B2 | 4/2006 | Khello et al. |
| 2003/0007482 A1 | 1/2003 | Khello et al. |
| 2005/0259658 A1 | 11/2005 | Logan et al. |

OTHER PUBLICATIONS

United States Patent and Trademark Office, "Non-Final Office Action," issued in connection with U.S. Appl. No. 12/509,801, on May 23, 2012 (11 pages).
United States Patent and Trademark Office, "Final Office Action," issued in connection with U.S. Appl. No. 12/509,801, on Oct. 15, 2012 (8 pages).
United States Patent and Trademark Office, "Notice of Allowance," issued in connection with U.S. Appl. No. 12/509,801, on Jan. 31, 2013 (6 pages).

*Primary Examiner* — Brendan Higa
(74) *Attorney, Agent, or Firm* — Hanley, Flight and Zimmerman LLC

(57) ABSTRACT

An example method involves, when telephone number mapping data packets are query packets, sending the query packets to a virtual Internet protocol address of a telephone number mapping domain name system server; when the telephone number mapping data packets are provisioning packets, sending the provisioning packets to a virtual Internet protocol address of a telephone number mapping lightweight directory access protocol server; and waiting and sending traffic to one lightweight directory access protocol server at a time.

16 Claims, 7 Drawing Sheets

Communication Devices

PRIOR ART

500

METHOD AND APPARATUS RESOLVING ENUM DATA COLLISIONS

PRIORITY APPLICATION

This is a continuation of U.S. patent application Ser. No. 12/509,801, filed Jul. 27, 2009, which is hereby incorporated herein by reference in its entirety.

FIELD OF THE DISCLOSURE

The present disclosure relates generally to tElephone NUmber Mapping (ENUM) provisioning and more specifically to a method and apparatus resolving ENUM data provisioning.

BACKGROUND

As large communication carriers migrate to an IP Multimedia Subsystem (IMS) based Voice over Internet Protocol (VoIP) using ENUM, a carrier grade ENUM system will be required that can provide desired characteristics such as scalability, fast response time, and overall efficient use of hardware and software resources to offer robust multimedia services. Presently, ENUM systems as generally configured in an IMS network can send two identical phone number records from different locations to the ENUM complex causing serious data collision problems that can cause IMS services to fail.

DETAILED DESCRIPTION

One embodiment of the present disclosure can entail a device having a controller to receive tElephone NUmber Mapping (ENUM) data packets, determine if the ENUM data packets are one of provisioning packets or query packets, send the query packets to a Virtual Internet Protocol (VIP) address of an ENUM domain name system (DNS) server when the ENUM data packets are query packets, send the provisioning packets to a VIP address of an ENUM Lightweight Directory Access Protocol (LDAP) server when the ENUM data packets are provisioning packets, and wait and send traffic to one LDAP server at a time.

Another embodiment of the present disclosure can entail a computer-readable storage medium having computer instructions for receiving tElephone NUmber Mapping (ENUM) data packets, monitoring to determine if the ENUM data packets are one of provisioning packets or query packets, sending the query packets to a Virtual Internet Protocol (VIP) address of an ENUM domain name system (DNS) server when the ENUM data packets are query packets, and sending the provisioning packets to a VIP address of an ENUM Lightweight Directory Access Protocol (LDAP) server when the ENUM data packets are provisioning packets.

Yet another embodiment of the present disclosure can entail a telephone Number Mapping (ENUM) system comprising a subsystem to monitor one or more operations of the ENUM system, determine if ENUM data packets that are received are one of provisioning packets or query packets, send the query packets to a Virtual Internet Protocol (VIP) address of an ENUM domain name system (DNS) server when the ENUM data packets are query packets, and send the provisioning packets to a VIP address of an ENUM Lightweight Directory Access Protocol (LDAP) server when the ENUM data packets are provisioning packets.

Figure 5:
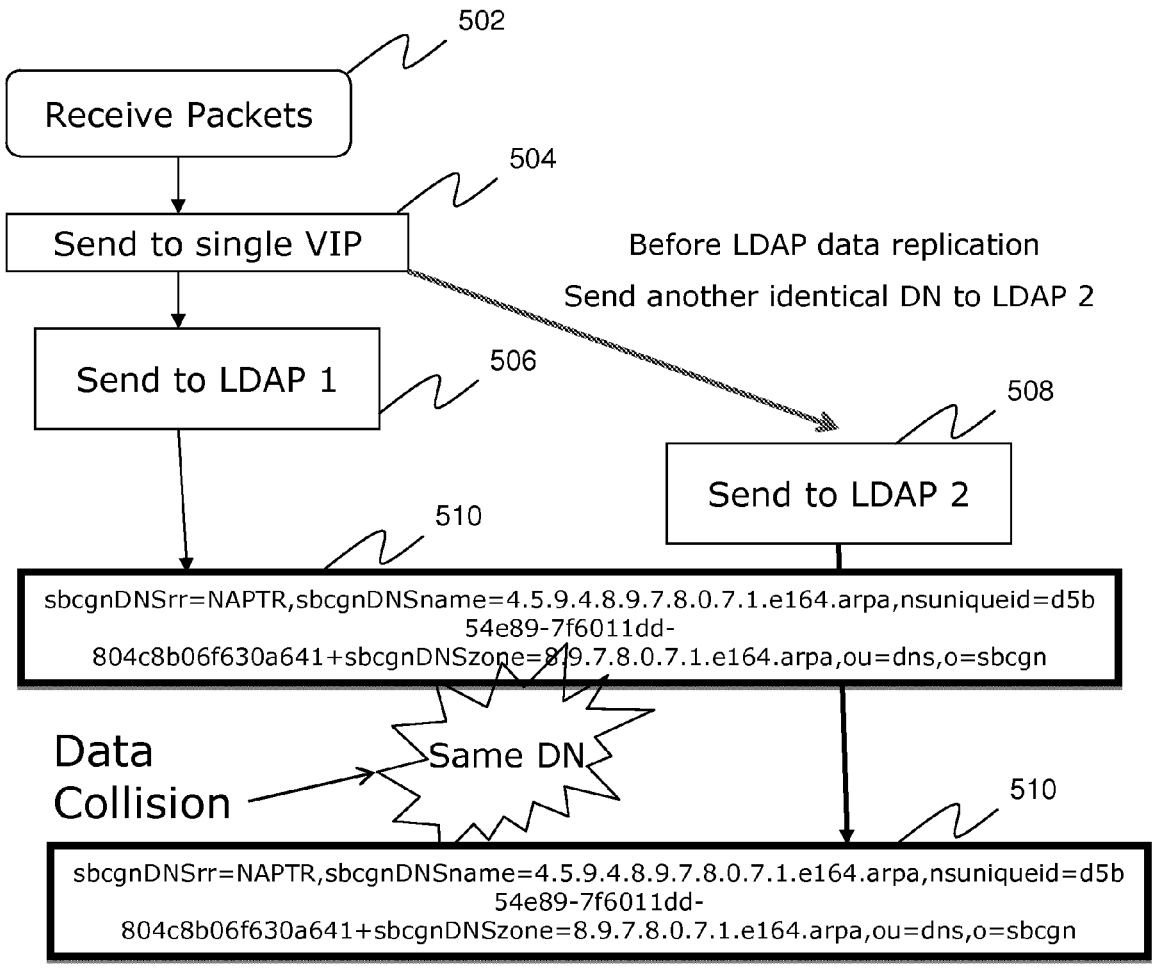
FIG. 5 illustrates a data collision as found in current ENUM systems.

The embodiments herein relate to a set of methods and systems to proactively identify and resolve data collisions in ENUM provisioning systems and to make automatic corrections to overcome predicted defects. In some current IMS Consumer VoIP (CVoIP) deployments as can be described with respect to FIG. 5, the remote back office provisioning systems can receive data packets at 502 and using a single Virtual IP (VIP) address at 504 send two identical phone number records (510) from different locations (LDAP 506 and LDAP 508) to the ENUM complex. The two identical records are sent since the provisioning requests are sent to a VIP address of a load balancer and the latter load balances between two ENUM complex built for redundancy purposes. Thus, it is possible that two duplicate record requests are sent and end up on different ENUM complexes. Since each ENUM complex uses its local LDAP server (506 and 508 in FIG. 5) for updates, the duplicate records on different local LDAP servers can cause serious data collision problems that can halt the internal LDAP replication process and further cause the IMS services to fail or to operate as usual. The embodiments herein increase the likelihood that an ENUM system can survive and operate in both IMS based CVoIP and Business VoIP (BVoIP) deployment.

Phone Number records are regarded as "Distinguished Name" (DN) in LDAP replication. Once the phone number requests are sent down from the upstream provisioning systems in a service provider's network operation center or NOC, the ENUM complex will process the requests and send ENUM data packets down to its local LDAP server for replication and then store in the available DNS servers for resolution of the incoming E-164 Telephone Number queries from the IMS core.

Multimaster replication uses a loose consistency replication model. This means that the same entries may be modified simultaneously on different servers. When updates are sent between the two servers, any conflicting changes must be resolved. Most resolution occurs automatically. For example, the timestamp associated with the change on each server is resolved by the most recent change taking precedence. However, some change conflicts require manual intervention to reach a resolution. In current IMS deployments, identical DNs cannot be resolved. This is an indication of a data collision, or of two entries created on different masters. When replicated, the entries cannot be reconciled, so the system typically ends up with two records. Unfortunately, the duplicate records and collisions can only be resolved manually by removing the one record that is no longer wanted. This is the main reason why it is undesirable to send and to update multiple masters at the same time. Such a scenario can really cause massive replication issues over time which would require spending an large amount of time in the manual removal of such duplicate DNs. Furthermore, the internal LDAP cannot be replicated and therefore IMS service will be impacted.

Figure 1:
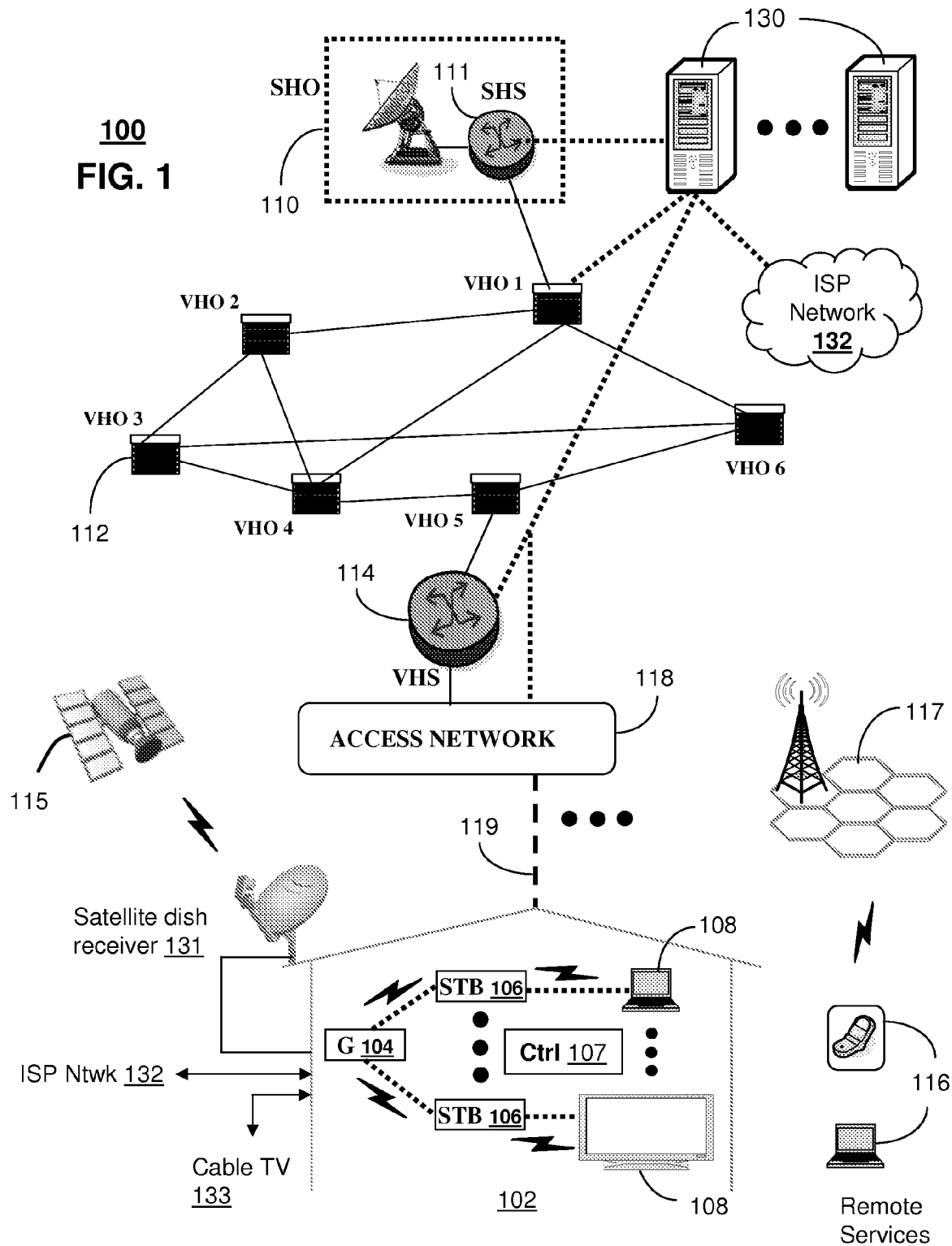
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super head-end office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
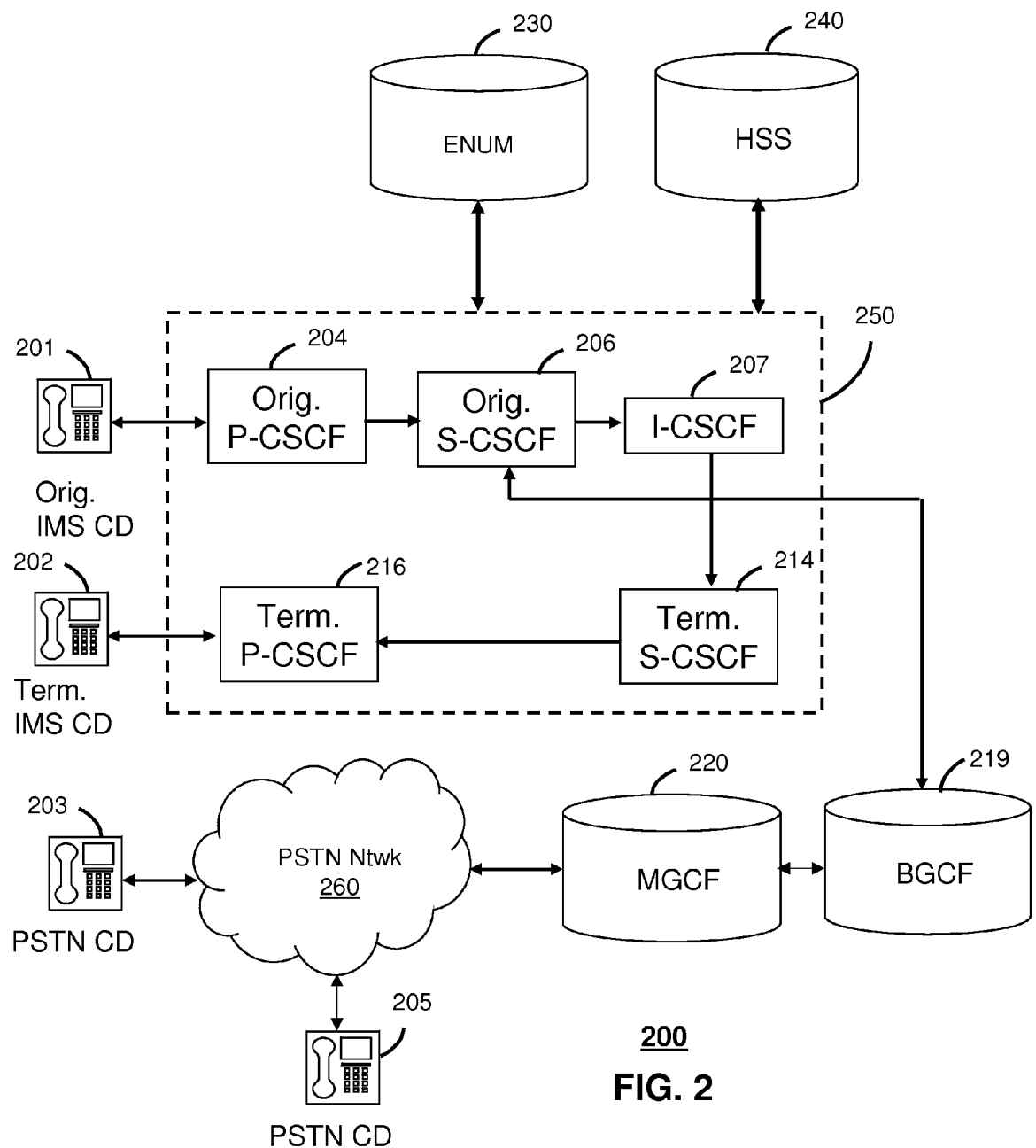

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operable coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant. Further detail will be discussed regarding the ENUM system or ENUM complex with respect to FIG. 7.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

Figure 3:
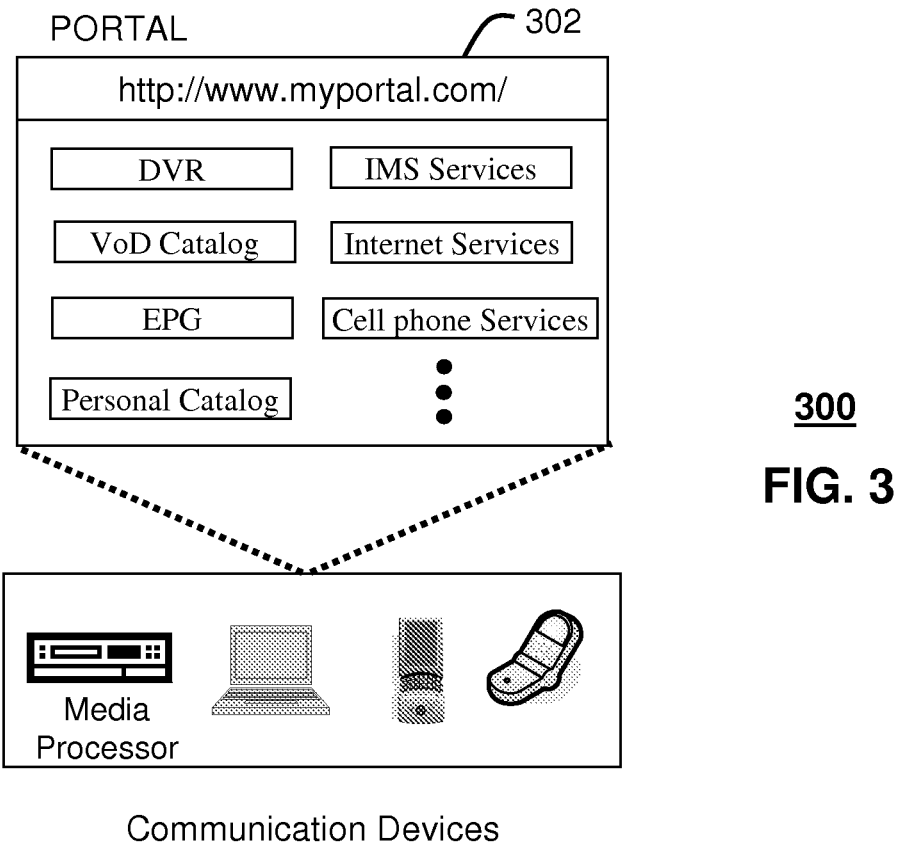
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
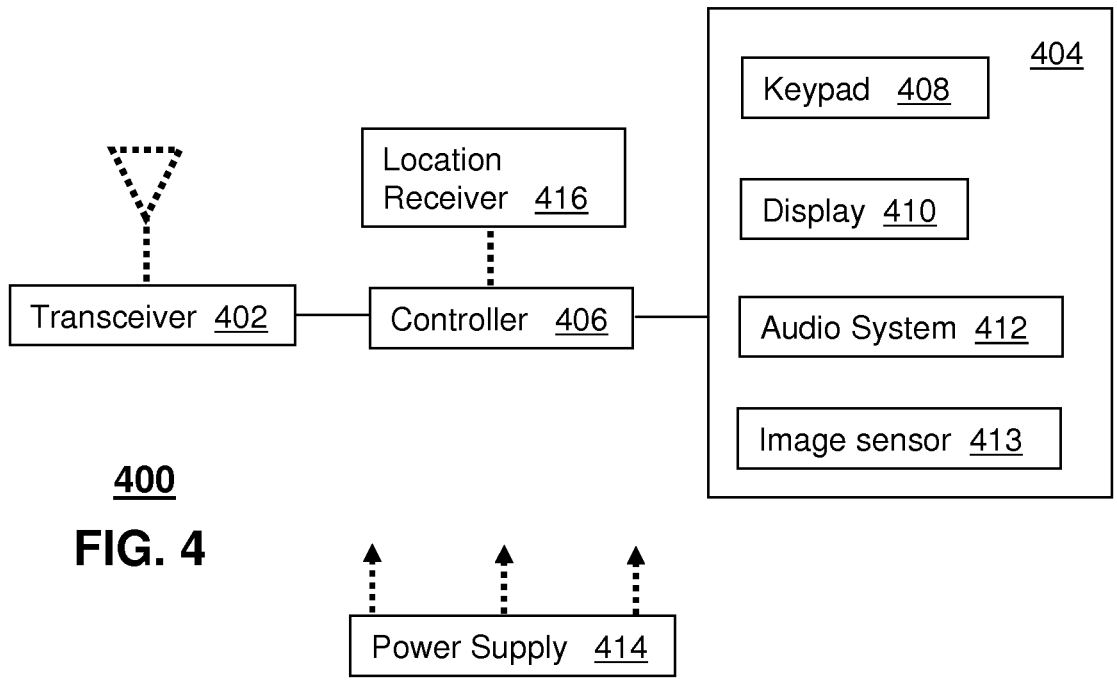
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alpha-numeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 6:
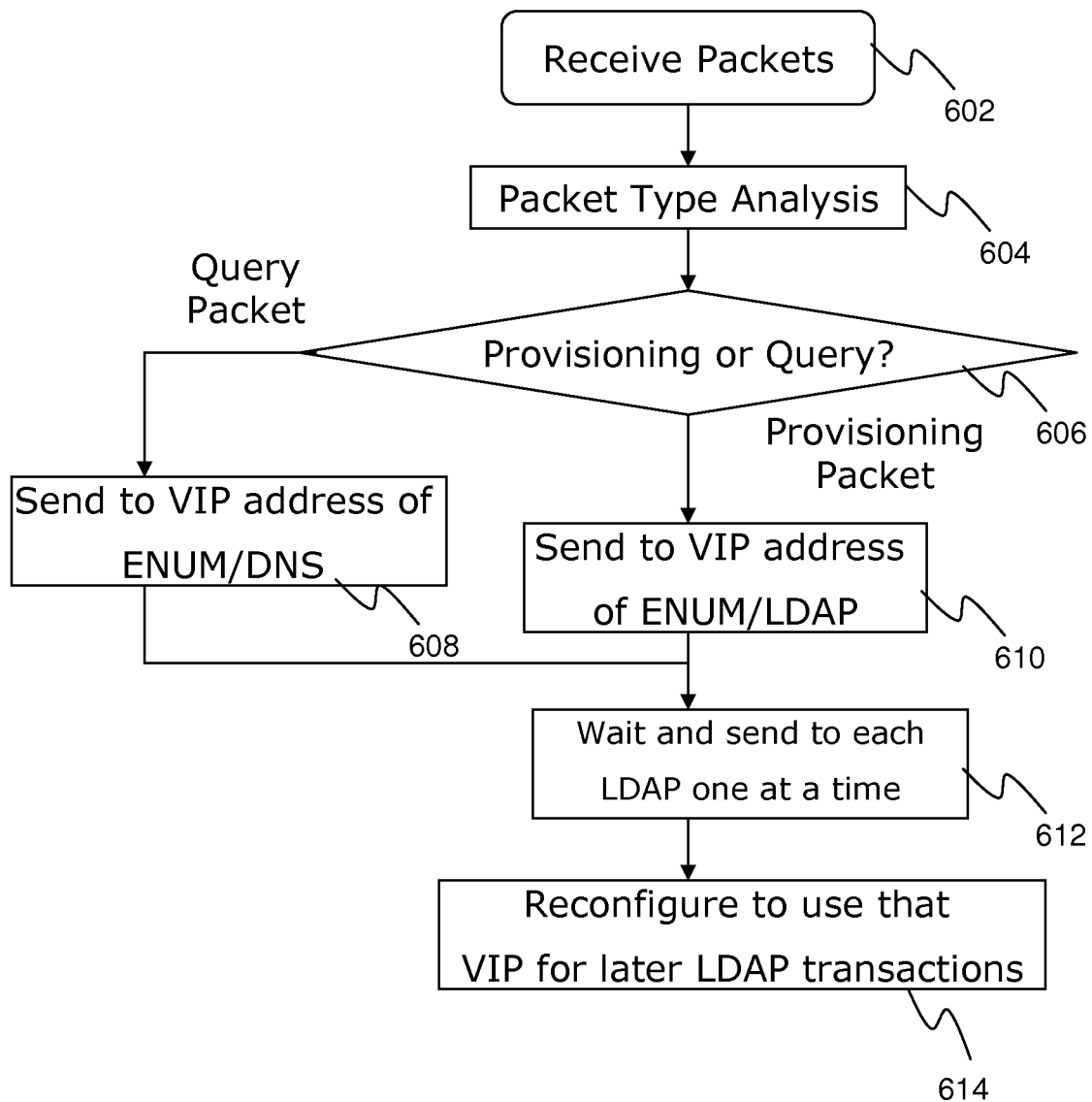
FIG. 6 depicts an illustrative embodiment of a method operating in portions of the communication systems of FIGS. 1-2.
Figure 8:
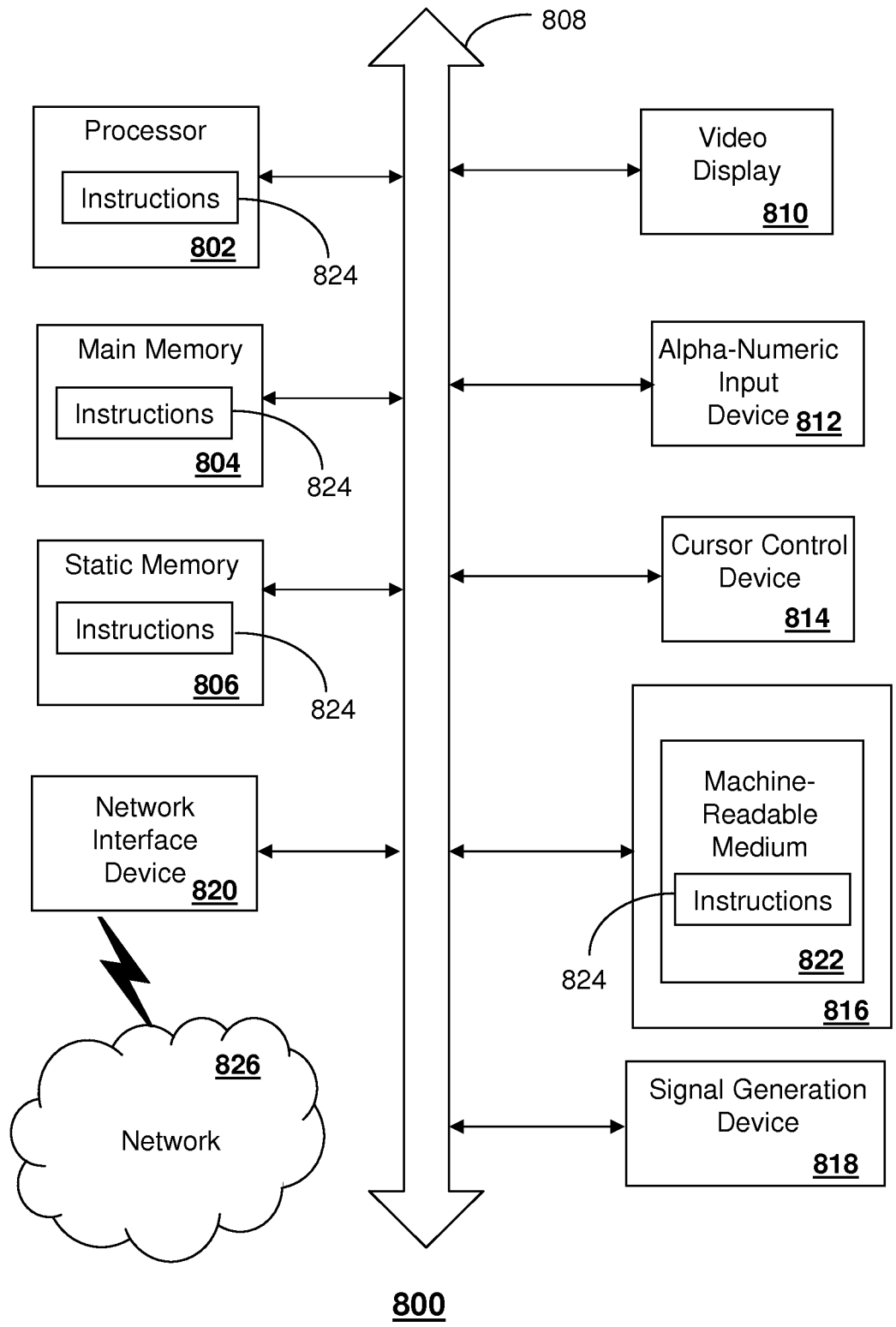
FIG. 8 is a diagrammatic representation of a machine in the form of a computer system within which a set of instructions, when executed, may cause the machine to perform any one or more of the methodologies discussed herein.

FIG. 6 depicts an illustrative method 600 that operates in portions of the communication system of FIG. 1 (or FIG. 8). Method 600 can begin with step 602 in which ENUM packets are received. Note that two 2 different Virtual IP (VIP) Addresses are created, one for ENUM/DNS servers, one for ENUM LDAP servers on a network element such as a load balancer. At 604, the method does a packet analysis whereupon at 606 upon receipt of an incoming ENUM data packet, the method can identify whether the packet is a query packet or a provisioning packet. One of the methods to identify or distinguish query and provisioning packet can be described below. A query packet from the S-CSCF of the IMS core can be in the form of
"OPCODE=SQUERY QNAME=2.2.2.2.5.5.5.2.1.2.1.e164.arpa, QCLASS=IN, QTYPE=NAPTR" whereas a provisioning packet can be in the form of plain text file or a XML file detailing the telephone number and the associated mapping to a Session Initiation Protocol (SIP) Uniform Resource Identifier (URI).

If the incoming packet is query packet, then the packet is sent to the VIP address of the ENUM/DNS servers at 608. The available ENUM/DNS servers will take turns to respond to the incoming IMS E 164 queries. If the incoming packet is a provisioning packet, then the packet is sent to the VIP address of the ENUM/LDAP servers at 610. ENUM application can be re-written or modified to make the system wait and then only send traffic to one LDAP server one at a time at 612 and then reconfigure ENUM complex to use that particular VIP for subsequent LDAP transactions at 614. Since the updates will only go to one server at a time, the collision problem will go away. The local LDAP can then replicate without problem and send update to the DNS server.

The embodiment here proactively detects the likelihood of a data collision and essentially eliminate or drastically reduce the need for manual intervention to remove duplicate DNs. The modifications can involve adding another LDAP VIP address (in addition to the current ENUM complex VIP address) and modifying or re-writing the ENUM application make the application wait to only send traffic to one LDAP server at a time and then reconfigure ENUM complex to use the VIP for LDAP subsequent transactions. Since the updates will only be going to one server at a time, the collision problem can be resolved. The local LDAP can then replicate without problem and send updates to the DNS server for resolution of incoming E164 queries from the IMS system.

Figure 7:
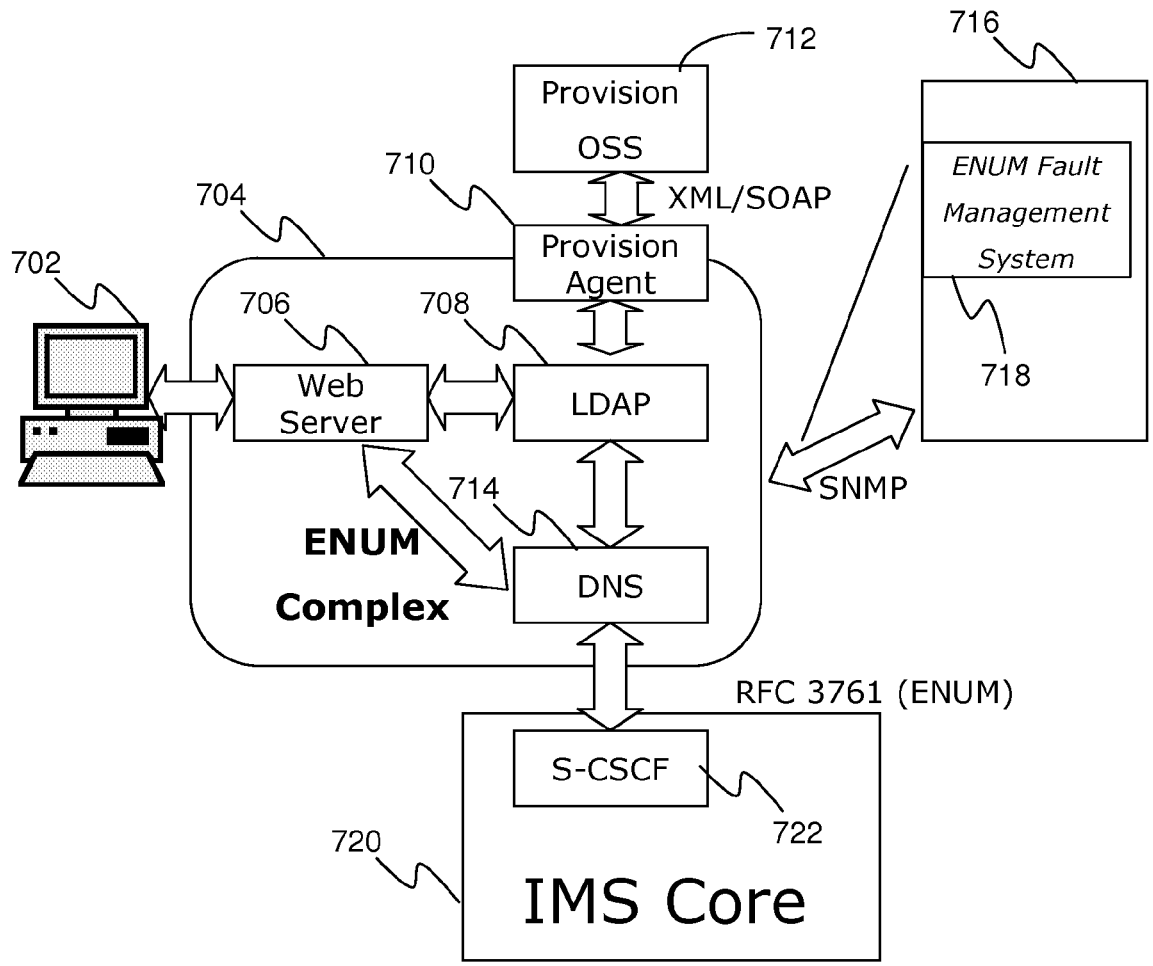
FIG. 7 depicts another illustrative embodiment of a communication system in accordance with the embodiments herein.

FIG. 7 depicts an exemplary embodiment of a communication system (or portion thereof) depicted as an IP Multimedia Subsystem (IMS) network 700. The IMS network 700 can comprise among other things a Proxy Call Session Control Function (P-CSCF) (not shown), an Interrogating CSCF (I-CSCF) (not shown), a Serving CSCF (S-CSCF) 722, a Home Subscriber Server (HSS) (not shown), an tElephone NUmber Mapping (ENUM) system or complex 704, one or more Domain Name Service (DNS) servers 714, one or more lightweight directory access protocol (LDAP) servers 708 organized by zones, an Application Server (AS) or web server 706, and a plurality of IMS User Equipment (UE) devices (not shown). The IMS UE devices can connect to networks, though not shown. The ENUM complex 704 can include the web server 706, and the LDAP 708 coupled to a provision open source software (OSS) server 712 via a provision agent 710. The provision agent 710 can provide flow thru provisioning to the Provision OSS server 712 using XMLISOAP protocols. The ENUM complex 704 can also include the LDAP 708 coupled to a DNS server 714. The DNS server 714 communicates with the S-CSCF 722 which can reside within an IMS core 720. The DNS server 714 can receive ENUM queries from various network elements such as the IMS core 720. The ENUM complex 704 can communicate with a Network Operation Center or NOC 716 and more particularly with an ENUM fault management system 718 within the NOC 716 using the SNMP protocol for example. The network can also include a computing device 702 that communicates via the web server 706 to the ENUM complex 704 for purposes of administration and manual provisioning among other tasks.

ENUM is a suite of protocols that is best suited to offer services that expand the means to complete calls over IP networks. ENUM accesses the DNS server 714 to translate E.164 telephone numbers into IP addressing schemes (e.g. SIP, H323, or email) where the DNS 714 can be used to look up Internet addresses for services such as VoIP telephony. Naming Authority Pointer or NPTR records are used for translating E.164 addresses to SIP addresses. The LDAP servers 708 can store resource records (RRs) in an object-oriented format such as by classes and corresponding zones. With classes and zones, RRs can be organized by a country code, a Numbering Plan Area (NPA), and/or a Numeric Numbering Exchange (NXX). As an example, an ENUM record can be broken into a number of zones such as by country (country code "1"), NPA ("222"), and/or NXX ("333").

A Network Operation Center 716 utilizing common computing and communications technologies can be used to monitor and maintain a desired operational performance of the ENUM system complex 704. In addition to the methods disclosed, the NOC 716 can apply mitigating steps to overcome predicted or detected faults when the operational efficiency of the ENUM system is in question. A P-CSCF can be a Session Initiation Protocol (SIP) proxy serving as a first point of contact to an IMS UE. An I-CSCF is a SIP proxy that can among other things query the HSS to retrieve IMS UE location and route SIP calls to its assigned S-CSCF 722. An S-CSCF 722 is a SIP server that can handle SIP registrations, which allows it to bind the IMS UE device.

Upon reviewing the aforementioned embodiments, it would be evident to an artisan with ordinary skill in the art that said embodiments can be modified, reduced, or enhanced without departing from the scope and spirit of the claims described below. For example, the embodiments are applicable to systems that have consumer VoP or business VoIP systems or systems that further include IPTV or iTV systems.

Other suitable modifications can be applied to the present disclosure without departing from the scope of the claims below. Accordingly, the reader is directed to the claims section for a fuller understanding of the breadth and scope of the present disclosure.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.P.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   when telephone number mapping data packets are query packets, sending the query packets to a virtual Internet protocol address of a telephone number mapping domain name system server;
   when the telephone number mapping data packets are provisioning packets, sending the provisioning packets to a virtual Internet protocol address of a telephone number mapping lightweight directory access protocol server; and
   waiting and sending traffic to one lightweight directory access protocol server at a time.

2. The method of claim 1, further comprising reconfiguring a telephone number mapping complex to use the virtual Internet protocol address of the telephone number mapping lightweight directory access protocol server for subsequent lightweight directory access protocol transactions.

3. The method of claim 1, wherein the method is performed in an Internet protocol multimedia subsystem based voice over internet protocol system.

4. The method of claim 1, further comprising avoiding data collisions by avoiding creation of identical domain names on different local lightweight directory access protocol servers serving as masters, wherein updates are sent to one lightweight directory access protocol server at a time.

5. The method of claim 1, further comprising avoiding sending updates to multiple master lightweight directory access protocol servers at the same time.

6. The method of claim 1, further comprising routing telephone number mapping packets addressed to the virtual Internet protocol address of the telephone number mapping lightweight directory access protocol server through a load balancer.

7. The method of claim 1, wherein the telephone number mapping domain name system server responds to incoming Internet protocol multimedia subsystem E164 queries.

8. The method of claim 1, further comprising using a local lightweight directory access protocol server to replicate lightweight directory access protocol data without creating a collision, and to send updates to the telephone number mapping domain name system server.

9. The method of claim 1, further comprising determining if the telephone number mapping data packets are one of provisioning packets or query packets by distinguishing the form of data packets as being a query packet if the packet is in the form of a defined OPCODE and as being a provisioning packet if the packet is in the form of a plain text file or an extensible markup language file detailing the telephone number and the associated mapping to a session initiation protocol uniform resource identifier.

10. A method, comprising:
monitoring to determine if telephone number mapping data packets are one of provisioning packets or query packets;
sending the query packets to a virtual Internet protocol address of a telephone number mapping domain name system server when the telephone number mapping data packets are query packets; and
sending the provisioning packets to a virtual Internet protocol address of a telephone number mapping lightweight directory access protocol server when the telephone number mapping data packets are provisioning packets.

11. The method of claim 10, wherein the method is performed in at least one of a telephone number mapping system or an Internet protocol multimedia subsystem network.

12. The method of claim 10, further comprising waiting and then sending traffic to one lightweight directory access protocol server at a time after determining if the telephone number mapping data packets are one of provisioning packets or query packets.

13. The method of claim 10, further comprising reconfiguring a telephone number mapping complex to use the virtual Internet protocol address of the telephone number mapping lightweight directory access protocol server for subsequent lightweight directory access protocol transactions.

14. The method claim 10, wherein the method is performed in an Internet protocol multimedia subsystem based voice over internet protocol system.

15. The method of claim 10, further comprising routing the telephone number mapping data packets addressed to the virtual Internet protocol address of the telephone number mapping lightweight directory access protocol server through a load balancer.

16. The method of claim 10, wherein the telephone number mapping domain name system server responds to incoming Internet protocol multimedia subsystem E164 queries.

* * * * *